Dec. 5, 1950 K. L. BURGENER 2,532,889

TIE LINE CIRCUIT ARRANGEMENT

Filed Feb. 8, 1946

INVENTOR.
KARL L. BURGENER

BY

Chas. W. Cardy

ATTORNEY

Patented Dec. 5, 1950 2,532,889

UNITED STATES PATENT OFFICE 2,532,889

TIE LINE CIRCUIT ARRANGEMENT

Karl L. Burgener, Villa Park, Ill., assignor to Automatic Electric Laboratories, Inc., Chicago, Ill., a corporation of Delaware Application February 8, 1946, Serial No. 646,463

14 Claims. (Cl. 179—51)

The present invention relates to telephone exchange systems in general, and more particularly to improved circuit arrangements for interconnecting two or more exchanges.

An object of the invention is to provide new and novel trunk circuit arrangements for joining a switchboard located in one branch exchange with a switchboard located in another branch exchange in order that connections may be established between telephone lines of different characters terminating at the respective branch exchange switchboards, and also connections between telephone lines terminating at the switchboard in one of the branch exchanges and telephone lines terminating in a main exchange, these latter connections being established in tandem through the switchboard located in the other branch exchange.

A feature of the invention is the provision of a novel tie line circuit for use between exchanges wherein improved means are employed to assure the proper transmission battery and supervisory arrangements to the connecting exchanges, dependent upon the character or class of connection being established.

Another feature of the invention relates to a tie line circuit wherein the same improved supervisory means as those previously mentioned are utilized to care for the supervisory conditions imposed when one end of the tie line circuit terminates in a local battery exchange or a local battery telephone.

A further feature of the invention resides in the circuit arrangement wherein a "wet" bridge normally connected across the talking conductors of the tie line circuit either remains so connected or is disconnected therefrom responsive to the tie line circuit being seized at one of the connecting exchanges for the extension of a particular class of call to the other connecting exchange, and in the cases where the "wet" bridge is so disconnected a "dry" bridge is partially connected in place of the "wet" bridge, the partial connection of the "dry" bridge being completed when the tie line circuit is seized at the second exchange.

A still further feature of the invention is that a "wet" bridge connected across the talking conductors of the tie line circuit is controllable from one end of the tie line circuit, and a "dry" bridge when connected across the talking conductors of the tie line circuit is controllable from either end of the tie line circuit.

There are other objects and features of the invention having to do for the most part with the circuit details necessary to carry out the foregoing.

The various objects and features of the invention will be understood best from a perusal of the following detail description in connection with the accompanying drawing, comprising Figs. 1 to 5 inclusive, which illustrates one embodiment of the invention. This drawing shows by means of the usual circuit diagrams a sufficient amount of apparatus to enable the invention to be described and understood.

Referring now to the drawing:

Fig. 1 shows a jack ending common battery circuit utilizing the present invention, the T and R terminals of which are connected to a conventional common battery manual switchboard to serve as a two-way trunk circuit for the switchboard. It should be understood, however, that the T and R terminals of Fig. 1 may be connected to a common battery telephone instrument instead of to a manual switchboard.

Fig. 2 shows a jack ending magneto, or local battery, circuit utilizing the present invention, the T and R terminals of which are connected to a local battery telephone instrument to serve as a two-way subscriber's line circuit. It should be understood in the case of Fig. 2 that the T and R terminals may be alternatively connected to a local battery manual switchboard to serve as a two-way trunk circuit.

Figure 5:
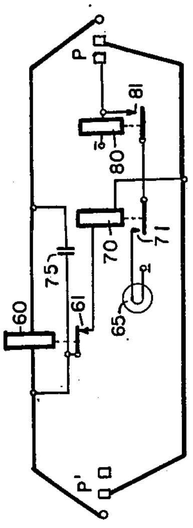

Fig. 5 shows a skeletonized cord circuit which provides means for completing inter-connections between the jack ending circuits of Figs. 1, 2, 3 and 4. Keys, relays, signals, etc., not essentially necessary for an understanding of the functioning of the cord circuit with respect to the jack ending circuits of Figs. 1, 2, 3 and 4 have been omitted from Fig. 5 for the sake of clarity. It should be understood, however, that the cord circuit may be fitted with facilities to accomplish any combinations of well-known functions associated with a manual telephone switchboard, as, for example, the cord circuit shown in Fig. 2 of Patent No. Re. 18,076, C. E. Lomax, dated May 19, 1931.

Figure 1:
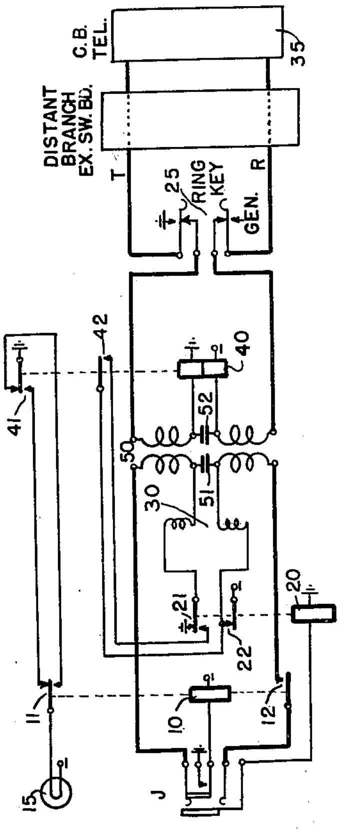
Figure 2:
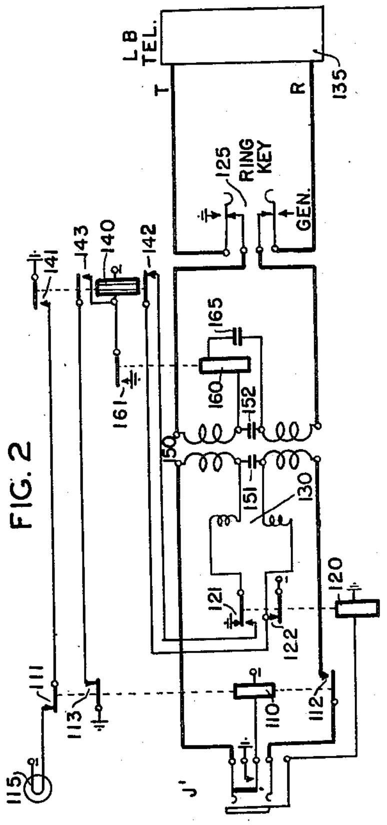
Figure 4:
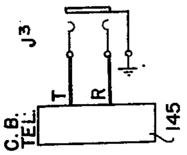
Fig. 4 shows a simple jack ending circuit, the T and R terminals of which are connected to a conventional common battery telephone instrument to serve as a one-way line circuit for incoming calls only to the telephone instrument.
Figure 3:
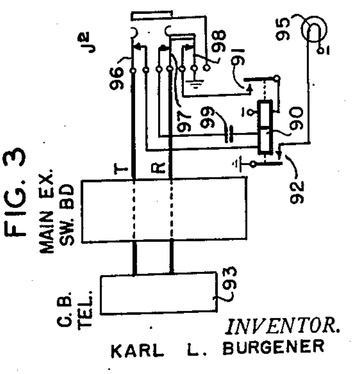
Fig. 3 shows a conventional jack ending two-way common battery ring down circuit, the T and R terminals of which are connected to a common battery main exchange of either the manual or automatic type to serve as a two-way trunk circuit for the main exchange.

Assuming that the jacks and call lamp signals of Figs. 1, 2 and 3 and the jacks of Fig. 4 are mounted in the face panels of a manual switchboard equipped with cord circuits of the type shown in Fig. 5 and located in a branch exchange which is intermediate to the distant branch exchange and the main exchange, a description of the various interconnections which can be made between the four types of jack ending circuits under the conditions outlined in this paragraph will now be given.

First, a call originated in the distant branch exchange for connection with a telephone line located in the main exchange will be traced. A substation 35 connected to the distant branch exchange signals the operator thereat in a well-known manner, and the operator extends the connection to Fig. 1 trunk circuit leading to the intermediate branch exchange switchboard, thus closing a loop across the T and R terminals of Fig. 1 trunk circuit. Relay 40 responds to the loop closure and, at armature 41 and working contact, completes the circuit of the trunk call lamp 15 at the intermediate branch exchange switchboard from ground, armature 41 and working contact, armature 11 and resting contact, trunk call lamp 15 to battery.

The operator at the intermediate branch exchange responding to the trunk call inserts plug P (Fig. 5) into jack J of the calling trunk circuit, thereby causing relay 10 to operate over an obvious circuit and retire trunk call lamp 15 at armature 11. The operation of relay 10 also closes the ring conductor of the trunk at armature 12. The insertion of plug P into jack J also completes a circuit through relays 20 and 80 from ground, winding of relay 20, sleeve of jack J, sleeve of plug P, winding of relay 80 to battery, causing relays 20 and 80 to operate. Relay 20 disconnects battery and ground from impedance coil 30, and relay 80 prepares part of a circuit for supervisory lamp signal 65. Although relay 70 is bridged across the talking conductors of the cord circuit, it does not operate at this time because of the operation of relay 20.

The operator at the intermediate branch exchange manipulates a talk key (not shown) in the cord circuit and learns that a connection is desired to the main exchange. She then inserts plug $P^1$ into jack $J^2$ (Fig. 3) of an idle trunk circuit leading to the main exchange, thus extending a loop controlled by armature 42 across the T and R conductors to the main exchange. A line relay (not shown) connected to the T and R conductors of Fig. 3 trunk circuit at the main exchange is thereby caused to operate and complete the circuit of the related trunk call lamp signal (not shown) at the main exchange. The main exchange trunk loop circuit may be traced as follows: ground over the T conductor (Fig. 3), spring 96 of jack $J^2$, tip of plug $P^1$, winding of series relay 60, tip of plug P, tip of jack J, upper left-hand winding of repeat coil 50, upper winding of impedance coil 30, armature 21 and working contact, armature 42, lower winding of impedance coil 30, lower left-hand winding of repeat coil 50, armature 12, ring of jack J, ring of plug $P^1$, spring 97 of jack $J^2$, R conductor to battery. Series relay 60 also operates over the loop circuit just described to prevent relay 70 from operating and completing the circuit of cord supervisory lamp 65 at armature 71.

The main exchange operator responds to the call by plugging an idle cord circuit (not shown) into the jack (not shown) terminating the Fig. 3 T and R conductors at the main exchange, thereby retiring the trunk call lamp signal at the main exchange. Armature 42 now controls the direct current loop from the main exchange cord circuit, and series relay 60 remains operated as long as relay 40 is held operated from the distant branch exchange. The main exchange operator now learns of the desired main exchange connection and extends the call to the wanted main exchange telephone line in a conventional well-known manner.

Upon the completion of the conversation between the calling substation in the distant branch exchange and the called substation in the main exchange, the calling substation gives the distant branch exchange operator disconnect supervision in the usual manner. The operator thereupon breaks the loop connection to relay 40, causing relay 40 to restore and, at armature 42, open the direct current flow through series relay 60. Series relay 60 accordingly restores and bridges relay 70 across the talking conductors through armature 61, causing relay 70 to operate and complete the circuit of supervisory lamp 65. The glowing of cord supervisory lamp 65 serves as a disconnect signal to the intermediate branch exchange operator who then takes down plugs P and $P^1$, this action restoring Fig. 1 trunk circuit to normal and, at the same time, giving disconnect supervision to the main exchange. The main exchange operator also receives disconnect supervision from the called main exchange substation in the usual manner.

At the time the distant exchange branch operator disconnected the loop circuit to relay 40, as explained in the preceding paragraph, the restoration of relay 40 also closed a circuit to the Fig. 1 trunk circuit call lamp 15 from ground, armature 41 and resting contact, armature 11 and working contact, call lamp 15 to battery, causing call lamp 15 to glow. On the type of connection just described, however, the intermediate branch exchange operator ignores the glowing of call lamp 15 when the distant branch exchange operator causes relay 40 to restore, because the glowing of cord supervisory lamp 65 at the same time constitutes a positive disconnect signal to the intermediate branch exchange operator. The purpose of having trunk call lamp 15 glow on a plugged up Fig. 1 trunk circuit will be explained later in the description of another type of connection.

Second, a call originated in the main exchange for connection with a substation located in the distant branch exchange will now be traced. A telephone line connected to the main exchange signals the operator thereat in the usual manner, and the operator extends the connection to a trunk circuit leading to the intermediate branch exchange by connecting with the T and R conductors of Fig. 3. Ringing current from the main exchange across the T and R conductors of Fig. 3 causes relay 90 to operate and lock through its second winding to ground supplied through spring 98 of jack $J^2$ and armature 91. The locking of relay 90 completes an obvious circuit to the related trunk call lamp signal 95 at the intermediate branch exchange.

The operator at the intermediate branch exchange responding to the trunk call inserts plug $P^1$ (Fig. 5) into jack $J^2$ of the calling trunk circuit, thereby opening the lock circuit of relay 90 at spring 98 and removing the ring-up winding of relay 90 from the T and R conductors at springs 96 and 97. The intermediate branch exchange operator then operates a talk key (not shown) in the cord circuit and learns that a connection is desired to the distant branch exchange. She next inserts plug P into jack J of an idle trunk circuit leading to the distant branch exchange, causing relays 10, 20 and 80 to operate, as previously explained. These three relays perform no important functions at this time. The intermediate branch exchange operator next operates the individual ringing key 25 associated with the trunk circuit to signal the distant branch exchange.

The operator at the distant branch exchange responding to the trunk call closes a loop across the T and R conductors of Fig. 1 trunk circuit. Relay 40 responds to the loop closure and, at armature 42, completes a loop circuit across the talking conductors to the left of repeat coil 50 and extending through Fig. 5 cord circuit all the way back to the calling main exchange. Battery and ground from the main exchange cord circuit over the last mentioned loop circuit causes series relay 60 in Fig. 5 cord circuit to operate and remove relay 70 from in bridge of the talking conductors at armature 61. The distant branch exchange operator now learns of the desired branch exchange connection and extends the call to the wanted branch exchange telephone line in a conventional well-known manner.

Upon the completion of the conversation between the calling substation in the main exchange and the called substation in the distant branch exchange, the calling substation gives the main office operator disconnect supervision in the usual manner. Similarly, the called substation gives the distant branch exchange operator disconnect supervision, and the distant branch exchange operator thereupon disconnects from Fig. 1 trunk circuit and thereby causes relay 40 to restore. The restoration of relay 40 opens the loop circuit from the main exchange through series relay 60 at armature 42, causing series relay 60 to restore and re-connect relay 70 in bridge of the talking conductors at armature 61. Relay 70 now operates over the loop circuit from the main exchange, and Fig. 5 cord circuit supervisory lamp 65 glows from ground, winding of relay 20, sleeve of jack J, sleeve of plug P, armature 81, armature 71, supervisory lamp 65 to battery. The intermediate branch exchange operator takes down plugs P and $P^1$, and the resultant breaking of the battery and ground loop from the main exchange cord circuit gives the main exchange operator disconnect supervision from the intermediate branch exchange. The main exchange operator now has double disconnect supervision.

As in the case of the first described connection between the distant branch exchange and the main exchange, trunk call lamp 15 also glows when the distant branch exchange operator opens the loop circuit to relay 40 on this connection but in this instance also the intermediate branch exchange operator accepts the glowing of cord supervisory lamp 65 as a positive disconnect signal.

Third, a call originated in the distant branch exchange for connection with the magneto telephone substation 135 (Fig. 2) will now be described. Substation 35 connected to the distant branch exchange signals the operator thereat in a well-known manner, and the operator extends the connection to Fig. 1 trunk circuit leading to the intermediate branch exchange switchboard, thus closing a loop across the T and R terminals of Fig. 1 trunk circuit. Relay 40 responds to the loop closure and, at armature 41 and working contact, completes the circuit to trunk call lamp 15 from ground, armature 41 and working contact, armature 11 and resting contact, trunk call lamp 15 to battery.

The intermediate branch exchange operator responding to the call inserts plug P into jack J of the calling trunk circuit, thereby causing relay 10 to operate over an obvious circuit. The operation of relay 10 retires trunk call lamp 15 at armature 11 and closes the ring conductor of the trunk circuit at armature 12. The insertion of plug P into jack J also completes a circuit through relays 20 and 80 from ground, winding of relay 20, sleeve of jack J, sleeve of plug P, winding of relay 80 to battery, causing relays 20 and 80 to operate. Relay 20 disconnects battery and ground from impedance coil 30, and relay 80 prepares part of a circuit for supervisory lamp 65.

The intermediate branch exchange operator manipulates a talk key (not shown) in the cord circuit and learns that a connection is desired to the local battery substation 135, the line circuit of which terminates in jack $J^1$ at the intermediate branch exchange switchboard. She then inserts plug $P^1$ into jack $J^1$ and operates the individual ringing key 125 of Fig. 2 line circuit to signal telephone 135. The insertion of plug $P^1$ into jack $J^1$ causes relay 110 to operate over an obvious circuit and close the line circuit ring conductor to Fig. 5 cord circuit at armature 112. The closure of the ring conductor at armature 112 causes series relay 60 in the cord circuit to operate from ground, armature 121 and resting contact, upper winding of impedance coil 130, upper left-hand winding of repeat coil 150, tip of jack $J^1$, tip of plug $P^1$, winding of series relay 60, tip of plug P, tip of jack J, upper left-hand winding of repeat coil 50, upper winding of impedance coil 30, armature 21 and working contact, armature 42, lower winding of impedance coil 30, lower left-hand winding of repeat coil 50, armature 12, ring of jack J, ring of plug P, ring of plug $P^1$, ring of jack $J^1$, armature 112, lower left-hand winding of repeat coil 150, lower winding of impedance coil 130, armature 122 to battery. The operation of series relay 60 opens the circuit to relay 70, thus retaining cord supervisory lamp 65 dark.

Substation 135 responds to the signalling from ringing key 125, and the voice transmission circuit is now complete between substations 35 and 135. Upon the termination of the conversation between substations 35 and 135, disconnect supervision is given to the distant branch exchange operator by substation 35 in the usual manner. The operator thereupon breaks the loop connection to relay 40, causing relay 40 to restore and, at armature 42, open the direct current flow through series relay 60. Series relay 60 accordingly restores and bridges relay 70 across the talking conductors through armature 61, causing relay 70 to operate and complete the circuit of supervisory lamp 65. The glowing of cord supervisory lamp 65 serves as a disconnect signal to the intermediate branch exchange operator who then takes down plugs P and $P^1$, this action restoring Fig. 1 trunk circuit and Fig. 2 line circuit to normal.

As in the cases of the previously described connections between the distant branch exchange and the main exchange, trunk call lamp 15 also glows when the distant branch exchange operator opens the loop circuit to relay 40 on this connection, but in this last instance also the intermediate branch exchange operator accepts the glowing of cord supervisory 65 as a positive disconnect signal.

Fourth, a call originated by local battery substation 135 for connection with substation 35 in the distant branch exchange will now be described. Substation 135 operates the hand generator associated with the substation in the usual manner, causing alternating current relay 160 to operate and close an obvious circuit to relay 140. Relay 140 in operating locks to ground through armatures 113 and 143 and closes the circuit to line lamp call signal 115 from ground, armature 141, armature 111, line lamp 115 to battery.

The intermediate branch exchange operator responding to the glowing of line lamp signal 115, inserts plug P into jack $J^1$ of the calling line circuit, thereby causing relays 80, 110 and 120 to operate over obvious circuits. At armature 111, relay 110 opens the circuit of line lamp 115: at armature 112, closes the ring conductor of the line circuit; and, at armature 113, opens the lock circuit of relay 140 and thus causes relay 140 to restore. Relay 120 removes battery and ground from the windings of impedance coil 130.

The intermediate branch exchange operator manipulates a talk key (not shown) in the cord circuit and learns that substation 135 desires a connection with substation 35 in the distant branch exchange. She then inserts plug $P^1$ into jack J of an idle Fig. 1 trunk circuit leading to the distant branch exchange, causing relay 10 to operate over an obvious circuit and complete the ring conductor of Fig. 1 trunk circuit at armature 12. A loop circuit through series relay 60 is thus closed from ground, armature 21 and resting contact, upper winding of impedance coil 30, upper left-hand winding of repeat coil 50, tip of jack J, tip of plug $P^1$, winding of series relay 60, tip of plug P, tip of jack $J^1$, upper left-hand winding of repeat coil 150, upper winding of impedance coil 130, armature 121 and working contact, armature 142, lower winding of impedance coil 130, lower left-hand winding of repeat coil 150, armature 112, ring of jack $J^1$, ring of plug P, ring of plug $P^1$, ring of jack J, armature 12, lower left-hand winding of repeat coil 50, lower winding of impedance coil 30, armature 22 to battery. Series relay 60 opens the circuit of relay 70, thus retaining supervisory lamp 65 dark. The intermediate branch exchange operator next operates individual ringing key 25 associated with Fig. 1 trunk circuit to signal the distant branch exchange.

The operator at the distant branch exchange responding to the call closes a loop across the T and R conductors of Fig. 1 trunk circuit. Relay 40 responds but performs no important functions at this time. The operator now learns that a connection is desired with substation 35 and extends the call to substation 35 in a conventional well-known manner.

Upon the termination of the conversation between substations 135 and 35, substation 135 gives disconnect supervision to the intermediate branch exchange switchboard by operating his hand generator momentarily. Relay 140 is thus caused to operate and open the loop through series relay 60 at armature 142 for an interval somewhat longer than the ring-off due to relay 140 being of the slow-to-release type. Series relay 60 accordingly restores and connects relay 70 across the cord circuit to operate from battery and ground supplied from Fig. 1 trunk circuit. Relay 70 completes the circuit to supervisory lamp 65 at armature 71. Relay 140 restores shortly after the ring-off and closes the loop through series relay 60, causing relay 60 to operate and disconnect relay 70 which in turn opens the circuit of supervisory lamp 65. Should the intermediate branch exchange operator fail to observe the ring-off supervision, disconnect supervison is obtaned in the following manner. Substation 35 gives the distant branch exchange operator disconnect supervision in a well-known manner, and the operator thereupon breaks the loop connection to relay 40, causing relay 40 to restore. Relay 40 completes the circuit to trunk call lamp 15 from ground, armature 41 and resting contact, armature 11 and working contact, trunk call lamp 15 to battery, causing lamp 15 to glow. The intermediate branch exchange operator noting lamp 15 glowing while plug $P^1$ is in jack J accepts this signal as a disconnect signal and, consequently, takes down plugs $P^1$ and P thus restoring Fig. 1 trunk circuit and Fig. 2 line circuit to normal.

Fifth, a call originated in the distant branch exchange for connection with common battery telephone 145 (Fig. 4) will now be described. Substation 35 connected to the distant branch exchange signals the operator thereat in a well-known manner, and the operator extends the connection to Fig. 1 trunk circuit leading to the intermediate branch exchange switchboard, thus closing a loop across the T and R terminals of Fig. 1 trunk circuit. Relay 40 responds and, at armature 41 and working contact, completes the circuit to trunk call lamp 15 from ground, armature 41 and working contact, armature 11 and resting contact, trunk call lamp 15 to battery.

The intermediate branch exchange operator responding to the call inserts plug P into jack J of the calling trunk circuit, thereby causing relay 10 to operate over an obvious circuit. The operation of relay 10 retires trunk call lamp 15 at armature 11 and closes the ring conductor of the trunk circuit at armature 12. The insertion of plug P into jack J also completes a circuit through relays 20 and 80 from ground, winding of relay 20, sleeve of jack J, sleeve of plug P, winding of relay 80 to battery, causing relays 20 and 80 to operate. Relay 20 disconnects battery and ground from impedance coil 30, and relay 80 performs no important function at this time.

The intermed'ate branch exchange operator now manipulates a talk key (not shown) in the cord circuit and learns that a connection is desired to common battery substation 145, the line circuit of which terminates in jack $J^3$ at the intermediate branch exchange switchboard. The operator not'ng that a connection to common battery substation 145 is wanted, removes plug P from jack J and inserts plug $P^1$ into jack J. The reason for switching plugs in the trunk circuit jack J is that it is necessary to provide transmission battery from Fig. 1 trunk circuit through Fig. 5 cord circuit to substation 145. Relay 20 does not operate over the sleeve of plug $P^1$ and, consequently, battery and ground remain connected to the windings of impedance coil 30 through armatures 21 and 22 and associated resting contacts. The operator then inserts plug P into jack $J^3$ and operates a ringing key (not shown) in the cord circuit to signal substation 145. Relay 80 operates over the sleeve circuit of plug P and jack $J^3$.

Substation 145 responds to the signalling from the cord circuit, and the voice transmission circuit is now complete between substations 35 and 145. Transmission battery is supplied to substation 145 through impedance coil 30 and the left-hand windings of repeat coil 50, cord circuit series relay 60 operating over this direct current loop. Upon the termination of the conversation between substations 35 and 145, disconnect supervision is given to the distant branch exchange operator by substation 35 in the usual manner, and to the intermediate branch exchange operator by substation 145. When substation 145 returns the handset to the telephone cradle, the loop circuit through series relay 60 is opened and series relay 60 restores. The restoration of series relay 60 connects relay 70 across the talking conductors of the cord circuit, causing relay 70 to operate and complete the circuit to cord supervisory lamp 65 from ground, sleeve of jack $J^3$, sleeve of plug P, armature 81, armature 71, lamp 65 to battery. Should the distant branch exchange operator open the loop circuit to relay 40 before the intermediate branch exchange operator takes down plgs $P^1$ and P, a circuit to trunk call lamp 15 would be completed from ground, armature 41 and resting contact, armature 11 and working contact, trunk call lamp 15 to battery. The intermediate branch exchange operator, however, ignores the glowing of trunk call lamp 15 under these conditions as she accepts the glowing of cord supervisory lamp 65 as a positive disconnect signal.

Sixth, a call originated by local battery substation 135 for connection with common battery telephone 145 (Fig. 4) will now be described. Substation 135 operates the associated hand generator in the usual manner, causing alternating current relay 160 to operate and close an obvious circuit relay 140. Relay 140 locks to ground through armatures 113 and 143 and closes the circuit to line call lamp 115 at armature 141. The intermediate branch exchange operator responding to the call inserts plug P into jack $J^1$, thereby causing relays 80, 110 and 120 to operate over obvious circuits. At armature 111, relay 110 opens the circuit of line lamp 151: at armature 112, closes the ring conductor of the line circuit; and, at armature 113, opens the lock circuit of relay 140. Relay 120 removes battery and ground from the windings of impedance coil 130.

The intermediate branch exchange operator manipulates a talk key (not shown) in the cord circuit and learns that a connection is desired to common battery substation 145. The operator then removes plug P from jack $J^1$ and inserts plug $P^1$ into jack $J^1$. Relay 120 does not operate over the sleeve of plug $P^1$ and, consequently, battery and ground are connected to the windings of impedance coil 130 through armatures 121 and 122 and associated resting contacts. The operator next inserts plug P into jack $J^3$ and operates a ringing key (not shown) in the cord circuit to signal substation 145. Relay 80 operates over the sleeve circuit of plug P and jack $J^3$.

Substation 145 responds to the signalling from the cord circuit, and the voice transmission circuit is complete between substations 135 and 145. Transmission battery is supplied to substation 145 through impedance coil 130 and the left-hand windings of repeat coil 150, cord circuit series relay 60 operating over this direct current loop. Upon the termination of the conversation between substations 135 and 145, series relay 60 restores and connects relay 70 across the cord circuit, and the cord supervisory lamp 65 glows from ground, sleeve of jack $J^3$, sleeve of plug P, armature 81, armature 71, lamp 65 to battery. The intermediate branch exchange operator takes down plugs P and $P^1$ to restore the circuits to normal.

Seventh, a call originated by local battery substation 135 for connection with a telephone line located in the main exchange will now be described. Substation 135 operates the hand generator, causing alternating current relay 160 to operate and close an obvious circuit to relay 140. Relay 140 locks to ground through armatures 113 and 143 and completes the circuit to line call lamp 115 at armature 141. The intermediate branch exchange operator responding to the call inserts plug P into jack $J^1$, thereby causing relays 80, 110 and 120 to operate over obvious circuits. At armature 111, relay 110 opens the circuit of line lamp 115: at armature 112, closes the ring conductor of the line circuit; and, at armature 113, opens the lock circuit of relay 140. Relay 120 removes battery and ground from the windings of impedance coil 130.

The intermediate branch exchange operator then manipulates a talk key (not shown) in the cord circuit and learns that a connection is desired to the main exchange. She next inserts plug $P^1$ into jack $J^2$ of an idle trunk circuit leading to the main exchange, thus extending a loop controlled by armature 142 across the T and R conductors to the main exchange. A line relay (not shown) connected to the T and R conductors of Fig. 3 trunk circuit at the main exchange is thereby caused to operate and complete the circuit of the related trunk call lamp signal (not shown) at the main exchange.

The main exchange operator responds to the call by plugging an idle cord circuit (not shown) into the jack (not shown) terminating the Fig. 3 T and R conductors at the main exchange, thereby retiring the trunk call lamp signal at the main exchange. Normally closed armature 142 now controls the direct current loop from the main exchange, and series relay 60 remains operated as long as relay 140 is in the normal position. The main exchange operator now learns of the desired main exchange connection and extends the call to the wanted telephone line in a conventional well-known manner.

Upon the termination of the conversation between substation 135 and the called substation in the main exchange, substation 135 gives disconnect supervision to the intermediate branch exchange switchboard by operating the hand generator. Relay 140 is thus caused to operate and open the loop through series relay 60 at armature 142. Series relay 60 accordingly restores and connects relay 70 across Fig. 5 cord circuit to operate from battery and ground supplied from the main exchange. Relay 70 completes the circuit to supervisory lamp 65 at armature 71. The intermediate branch exchange operator takes down plugs P and $P^1$, thus giving disconnect supervision to the main exchange. The main exchange operator also receives disconnect supervision from the called main exchange substation in the usual manner.

Eighth, a call originated in the main exchange for connection with substation 135 will now be described. A telephone line circuit connected to the main exchange signals the operator thereat in the usual manner, and the operator extends the connection to a trunk circuit leading to the intermediate branch exchange. Ringing current from the main exchange across the T and R conductors of Fig. 3 causes relay 90 to operate and lock through its second winding to ground supplied through spring 98 of jack $J^2$ and armature 91. The locking of relay 90 completes an obvious circuit to trunk call lamp 95 at the intermediate branch exchange.

The operator at the intermediate branch exchange responding to the trunk call inserts plug $P^1$ into jack $J^2$ of the calling trunk circuit, thereby opening the lock circuit of relay 90 at spring 98 and removing the ring-up winding of relay 90 from the T and R conductors at springs 96 and 97. The operator then manipulates a talk key (not shown) in the cord circuit and learns that a connection is desired to substation 135. She next inserts plug P into jack $J^1$ and operates the individual ringing key 125 of Fig. 2 line circuit to signal telephone 135. The insertion of plug P into jack $J^1$ causes relays 80, 110 and 120 to operate over obvious circuits. At armature 112, relay 110 closes the ring conductor of Fig. 2 line circuit. At armatures 121 and 122, relay 120 disconnects ground and battery from impedance coil 130; and, at armature 121 and working contact, completes a direct current loop from the main exchange through series relay 60 and armature 142.

Substation 135 responds to the signalling from ringing key 125, and the voice transmission circuit is now complete between the calling main exchange substation and substation 135. Upon the termination of the conversation, the calling substation gives the main exchange operator disconnect supervision in the usual manner. Substation 135 gives the intermediate branch exchange operator disconnect supervision by operating the hand generator, thus causing relay 140 to operate and open the loop circuit through series relay 60 at armature 142. Series relay 60 accordingly restores and connects relay 70 across Fig. 5 cord circuit to operate from battery and ground supplied from the public exchange. Relay 70 completes the circuit to supervisory lamp 65 at armature 71. The intermediate branch exchange operator takes down plugs P and $P^1$, thus giving the main exchange operator disconnect supervision.

It is possible to complete a call from the main exchange over Fig. 3 trunk circuit to the intermediate branch exchange for connection to common battery substation 145 (Fig. 4), but no detail description will be given because the present invention is not concerned with such a connection.

It should be understood at this time that while the foregoing description and associated drawing disclose the invention as specifically applied to connecting exchanges of the manual switchboard type, the invention is not limited to such exchanges but may be applied to any group of connecting exchanges where tie line circuits are employed.

Having described the invention and what is considered new and desired to be protected by Letters Patent is set forth in the following claims:

1. In a trunk circuit having a pair of conductors, a winding, a circuit connected in bridge of said conductors through said winding, an incomplete circuit, a jack having terminals, a relay connected to one of said terminals and operated thereover for disabling said first circuit and for bridging said incomplete circuit across said conductors through said winding, a relay operated over said trunk circuit for completing said incomplete circuit bridged across said conductors, said last completed circuit thereafter controlled by said last relay.

2. In a trunk circuit, conductors, a double wound coil, a power source connected through both windings of said coil in circuit with said conductors, means for disconnecting said power source from said windings, a partly prepared dry circuit, means for further preparing said partly prepared dry circuit, and a relay later operated over said trunk circuit for completing said further prepared dry circuit through said windings.

3. In a trunk circuit having two pairs of conductors linked together, a coil having two windings normally connected in bridge of one pair of said conductors, a jack having three or more terminals, said one pair of conductors terminating in two of said terminals, a relay connected to a third terminal of said terminals, said relay operated responsive to a circuit closure over said third terminal for disabling said normal circuit of said coil, and a second relay in bridge of the other pair of said conductors and operative thereover for completing a second circuit in bridge of said first pair of conductors through contacts of said first operated relay and both windings of said coil.

4. In a trunk circuit, two pairs of conductors inductively coupled together, a circuit connected in bridge of one of said pairs of conductors, means for opening said connected circuit and partly connecting a second circuit in bridge of said one pair of conductors, and a relay in bridge of said other pair of conductors and operative thereover for completing and controlling said second circuit at will.

5. In a trunk circuit, two pairs of conductors, means inductively intercoupling said pairs of conductors, a jack having more than one terminal, one pair of said coupled conductors terminating in two terminals of said jack, a double wound coil, a power source connected in circuit with said one pair of conductors through the windings of said coil, a relay connected in circuit with said other pair of conductors and operative thereover for partly completing a circuit through both windings of said coil in bridge of said first pair of conductors, and another relay connected to a third terminal of said jack and operative thereover for disconnecting said power source from the windings of said coil and completing said partly completed circuit through said windings.

6. In a trunk circuit, a jack having terminals, two pairs of talking conductors, one pair of said conductors terminating in two terminals of said jack at one end and at the other end inductively coupled to said second pair of conductors, a coil normally connected in bridge of said first pair of conductors, a call signal, a relay responsive to an incoming call received over said second pair of conductors for causing said call signal to operate and for partially establishing another circuit in bridge of said first pair of conductors for said coil, means responsive to a connection with said jack when said incoming call is answered for disabling said call signal, for disabling said normal bridge circuit of said coil, and for completing said partially established circuit.

7. In a trunk circuit, two pairs of conductors, a jack having terminals, one pair of said conductors terminating in two terminals of said jack at one end and at the other end inductively coupled to said second pair of conductors, a winding normally connected in circuit with said one pair of conductors, a relay, said relay connected to a third terminal of said jack and operated responsive to a circuit closure over said third terminal for disabling said normal circuit of said winding and completing a second circuit in bridge of said one pair of conductors through said winding, and means operated over said other pair of conductors later controlling said second circuit.

8. In a telephone system, a link having talking conductors, a trunk having talking conductors, a winding, a source of current connected in bridge of said talking conductors of said trunk through said winding, means in said trunk responsive to the connection of said link with said trunk for disconnecting said current source from said winding and partly establishing a dry control circuit through said winding to the talking conductors of said trunk and thereover to the talking conductors of said link, means for signalling over said trunk, and means in said trunk responsive to the answering of said signalling for completing said partly established control circuit to the talking conductors of said link for supervisory purposes.

9. In a telephone system, a trunk inductively divided into two sections, a coil, a power source connected in bridge of one of said sections through said coil, a call signal, means responsive to an incoming call received over said other section for causing said call signal to function, a dry circuit partly connected in bridge of said one section through said coil, a circuit having supervisory means for answering incoming calls on said trunk, means responsive to the connecting of said answering circuit with said one section of said trunk for disabling said call signal, for disconnecting said power source from said coil, and for completing the connection of said dry circuit in bridge of said one section through said coil, said connected dry circuit constituting a control bridge for said supervisory means of said answering circuit, said control bridge controllable over said other section.

10. In a telephone system, a cord circuit having two plugs, a jack ending trunk having talking conductors, a wet circuit connected in bridge of said conductors, a dry circuit partly connected in bridge of said conductors, said wet circuit remaining connected in bridge of said conductors when one of said plugs is inserted into the jack of said trunk, said wet circuit opened and said partly connected dry circuit completely connected in bridge of said conductors when said other plug is inserted into said jack.

11. In a telephone system, a trunk having a control bridge normally connected across its talking conductors, a second control bridge partly connected across said conductors, a link circuit having two connecting means, said first control bridge remaining connected across said conductors when one of said connecting means of said link circuit connects with said trunk, said first control bridge disconnected from said conductors and said second control bridge completely connected across said conductors when said other means of said link circuit connects with said trunk.

12. In a telephone system, a trunk having talking conductors, a relay, a circuit, a coil, said relay in one position connecting said circuit through said coil in bridge of said conductors, said relay in another position disconnecting said circuit from said coil and substituting a second circuit for said first circuit in said bridge, two connecting means for connecting with said trunk, one of said connecting means when connecting with said truk causing said relay to hold in one position, said other connecting means when connecting with said trunk causing said relay to switch to the other position.

13. In a telephone system, a trunk having a transmission battery feed normally connected in bridge of said trunk, a dry circuit partially connected in bridge of said trunk, a line of certain character, another line of different character, a link for interconnecting said trunk with either of said lines, said transmission battery feed extended from said trunk through said link to said line of said certain character responsive to the connection of said trunk with said line of said certain character by said link, said transmission battery feed thereafter controllable from said line of said certain character, means for disconnecting said transmission battery feed from in bridge of said trunk and completely connecting said partially connected dry circuit in bridge of said trunk, said completed dry bridge extended through said link to said other line of said different character responsive to the connection of said trunk with said other line of said different character by said link, said completed and extended dry bridge thereafter controllable over said trunk.

14. In a telephone system, a line having a current source in bridge of said line, a second line having a dry circuit partly in bridge of said second line, a trunk having an incomplete dry bridge and a complete wet bridge, a link for connecting said trunk with either of said lines, said link having a supervisory signal, means for completing said incomplete dry bridge of said trunk, said completed dry bridge extended through said link to said current source in said first line responsive to said link connecting said trunk with said first line, said supervisory signal in said link thereafter controllable from said trunk over said completed and extended dry bridge, means for completing said partly complete dry circuit in said second line, said last completed dry circuit extended through said link to said wet bridge in said trunk responsive to said link connecting said trunk with said second line, said supervisory signal in said link now controllable from said second line over said extended dry circuit through said link.

KARL L. BURGENER.

REFERENCES CITED

The following references are of record in the file of this patent:

UNITED STATES PATENTS

| Number | Name | Date |
|---|---|---|
| 1,399,998 | Raynsford | Dec. 13, 1921 |
| 2,073,003 | Darrow | Mar. 9, 1937 |
| 2,292,371 | Ferrell | Aug. 11, 1942 |